United States Patent
Do et al.

(10) Patent No.: US 11,056,749 B2
(45) Date of Patent: Jul. 6, 2021

(54) SECONDARY BATTERY AND METHOD FOR MANUFACTURING THE SAME

(71) Applicant: LG Chem, Ltd., Seoul (KR)

(72) Inventors: Jin Uk Do, Daejeon (KR); Je Jun Lee, Daejeon (KR); Sang Suk Jung, Daejeon (KR); Min Ki Jo, Daejeon (KR)

(73) Assignee: LG Chem, Ltd.

(*) Notice: Subject to any disclaimer, the term of this patent is extended or adjusted under 35 U.S.C. 154(b) by 186 days.

(21) Appl. No.: 16/333,858

(22) PCT Filed: Jul. 12, 2018

(86) PCT No.: PCT/KR2018/007928
§ 371 (c)(1),
(2) Date: Mar. 15, 2019

(87) PCT Pub. No.: WO2019/013574
PCT Pub. Date: Jan. 17, 2019

(65) Prior Publication Data
US 2019/0267593 A1    Aug. 29, 2019

(30) Foreign Application Priority Data

Jul. 13, 2017    (KR) .......................... 10-2017-0089039

(51) Int. Cl.
*H01M 50/317*    (2021.01)
*H01M 10/04*    (2006.01)
(Continued)

(52) U.S. Cl.
CPC ........... *H01M 50/317* (2021.01); *B23K 26/21* (2015.10); *H01M 4/04* (2013.01); *H01M 10/04* (2013.01);
(Continued)

(58) Field of Classification Search
CPC ........ H01M 2/36; H01M 2/361; H01M 2/362; H01M 2/12; H01M 2/1223
See application file for complete search history.

(56) References Cited

U.S. PATENT DOCUMENTS 6,326,100 B1    12/2001    Han et al.
2013/0130079 A1*    5/2013    Kako .................... H01M 2/365
429/82

(Continued)

FOREIGN PATENT DOCUMENTS

DE    602004010827 T2    12/2008
DE    102012219887 A1    4/2014
(Continued)

OTHER PUBLICATIONS

Extended European Search Report with Written Opinion for Application No. 18832290.3 dated Dec. 16, 2019, 8 pages.
(Continued)

*Primary Examiner* — Matthew J Merkling
(74) *Attorney, Agent, or Firm* — Lerner, David, Littenberg, Krumholz & Mentlik, LLP

(57) ABSTRACT

To solve the above-described objects, a method for manufacturing a secondary battery according to an embodiment of the present invention comprises: manufacturing an electrode assembly in which electrodes and a separator are alternately stacked; inserting the electrode assembly into a battery case through an opening; covering the opening of the battery case; injecting an electrolyte into the battery case through an injection hole formed in the battery case; closing the injection hole; performing a pre-formation process; and applying external force to a switch of a gas discharge device formed on one surface of the battery case, thereby linearly moving a gasket of the gas discharge device and opening a gas discharge hole, such that a first gas generated in the battery case is discharged to an outside of the battery case during the performing of the pre-formation process.

10 Claims, 6 Drawing Sheets

(51) Int. Cl.
  *H01M 4/04* (2006.01)
  *B23K 26/21* (2014.01)
  *H01M 50/30* (2021.01)
  *H01M 50/60* (2021.01)
  *H01M 50/183* (2021.01)

(52) U.S. Cl.
  CPC ..... *H01M 10/0436* (2013.01); *H01M 50/183* (2021.01); *H01M 50/30* (2021.01); *H01M 50/60* (2021.01)

(56) References Cited

U.S. PATENT DOCUMENTS

| | | |
|---|---|---|
| 2014/0093757 A1 | 4/2014 | Sakai et al. |
| 2015/0236336 A1 | 8/2015 | Hirakawa et al. |
| 2015/0325833 A1* | 11/2015 | Harayama ............ H01M 2/043 429/185 |

FOREIGN PATENT DOCUMENTS

| | | |
|---|---|---|
| DE | 102013203037 A1 | 8/2014 |
| EP | 1661193 B1 | 12/2007 |
| JP | 2000311670 A | 11/2000 |
| JP | 2003142060 A | 5/2003 |
| JP | 2005222757 A | 8/2005 |
| JP | 2012234784 A | 11/2012 |
| JP | 2014093230 A | 5/2014 |
| KR | 20080042966 A | 5/2008 |
| KR | 20090095334 A | 9/2009 |
| KR | 20120029320 A | 3/2012 |
| KR | 20160047217 A | 5/2016 |

OTHER PUBLICATIONS

International Search Report for Application No. PCT/KR2018/007928 dated Oct. 12, 2018.

* cited by examiner

SECONDARY BATTERY AND METHOD FOR MANUFACTURING THE SAME

CROSS-REFERENCE TO RELATED APPLICATION

The present application is a national phase entry under 35 U.S.C. § 371 of International Application No. PCT/KR2018/007928, filed on Jul. 12, 2018, published in Korean, which claims priority from Korean Patent Application No. 10-2017-0089039, filed on Jul. 13, 2017, the disclosures of which are hereby incorporated herein by reference.

TECHNICAL FIELD

The present invention relates to a secondary battery and a method for manufacturing the same, and more particularly, to a secondary battery in which a gas discharge device capable of easily discharging a gas within a battery case is formed to perform pre-formation even after an assembly process and thereby to reduce an assembling time, improve an initial charging rate, and increase in gas discharge amount, and a method for manufacturing the same.

BACKGROUND ART

Batteries (cells) that generate electric energy through physical or chemical reaction to supply the generated electric energy to the outside are used when AC power to be supplied to the building is not obtained, or DC power is required according to the living environments surrounded by various electronic devices.

Among such batteries, primary batteries and secondary batteries, which are chemical cells using chemical reaction, are generally used. The primary batteries are consumable cells which are collectively referred to as dry cells. On the other hand, a secondary battery is a rechargeable battery that is manufactured by using a material in which oxidation and reduction processes between current and a material are capable of being repeated many times. That is, when the reduction reaction to the material is performed by the current, power is charged. When the oxidation reaction to the material is performed by the current, power is discharged. Such charging-discharging are repeatedly performed to generate electricity.

Particularly, a lithium battery using lithium (Li) may be classified into a lithium metal battery, a lithium ion battery, and a lithium secondary battery according to types of electrolyte. Here, since the lithium secondary battery has a solid or gel-type electrolyte, even if the battery is broken due to an unexpected accident, the electrolyte does not leak to the outside. Thus, since there is no possibility of ignition or explosion, stability may be secured, and energy efficiency may be improved.

Such a secondary battery is classified into a pouch type secondary battery and a can type secondary battery according to a material of a container accommodating an electrode assembly. In the pouch type secondary battery, an electrode assembly is accommodated in a pouch made of a flexible polymer material having a variable shape. Also, in the can type secondary battery, an electrode assembly is accommodated in a case made of a metal or plastic material having a predetermined shape.

The can type secondary battery is classified into a prismatic type secondary battery in which the case has a polygonal shape and a cylinder type secondary battery in which the case has a cylindrical shape according to the shape of the case.

In the pouch type secondary battery, an injection hole is sealed after an electrolyte is injected, and then, a formation process is performed. Also, a hole is punched in one surface of the pouch to perform a degassing process for discharging a gas generated in the battery. Here, in the pouch type secondary battery, since the formation process is performed after the injection hole is completely closed, a charging rate may be high, and the gas may be quickly discharged. Thus, the secondary battery may be manufactured within a predetermined process time.

However, in the can type secondary battery, since a hole is not punched in one surface of the case, and the case is completely sealed after the injection hole is completely sealed, it is impossible to perform the degassing process. Thus, in order to prevent moisture from being permeated, the pre-formation process is performed in a dry room before the injection hole is closed. However, in order to complete the manufacture of the secondary battery within the predetermined process time, the gas is not completely discharged, and the injection hole is closed. Thus, only a small amount of gas is discharged, and a portion of the gas remains within the case. The completely manufactured secondary battery may increase in thickness due to the remaining gas. Also, when the formation process is performed after the injection hole is closed, there is no method to charge the gas generated in the case.

DISCLOSURE OF THE INVENTION

Technical Problem

It is an object to be solved by the present invention to provide a secondary battery in which a gas discharge device capable of easily discharging a gas within a battery case is provided and a method for manufacturing the same.

The objects of the present invention are not limited to the aforementioned object, but other objects not described herein will be clearly understood by those skilled in the art from descriptions below.

Technical Solution

To achieve the above-described object, a method for manufacturing a secondary battery according to an embodiment of the present invention comprises: a step of manufacturing an electrode assembly in which electrodes and a separator are alternately stacked; a step of inserting the electrode assembly into a battery case, which is maintained in a predetermined outer appearance, through an opening; a step of covering the opening of the battery case; a step of injecting an electrolyte into the battery case through an injection hole formed in the battery case; a step of closing the injection hole; a step of performing a pre-formation process; and a step of applying external force to a switch of a gas discharge device formed on one surface of the battery case, thereby linearly moving a gasket of the gas discharge device and opening a gas discharge hole, such that a first gas generated in the battery case is discharged to an outside during the step of performing the pre-formation process.

Also, after the step of discharging the first gas to the outside of the battery case, the method may further comprise a step of sealing the gas discharge device.

Also, the step of sealing of the gas discharge device may further comprise: a step of covering the gas discharge device with a cap; and a step of performing laser welding to affix the cap to the battery case.

Also, after the step of discharging the first gas to the outside of the battery case, the method may further comprise a step of performing a formation process.

Also, after the step of performing of the formation process, the method may further comprise: a step of applying the external force to the switch of the gas discharge device; and a step of linearly moving the gasket of the gas discharge device and opening the gas discharge hole, such that a second gas generated in the battery case is discharged to anoutside of the battery case during the step of performing the formation process.

Also, after the step of discharging the second gas to the outside of the battery case, the method may further comprise a step of sealing the gas discharge device.

Also, the step of sealing the gas discharge device may further comprise: a step of covering the gas discharge device with a cap; and a step of performing laser welding to affix the cap to the battery case.

Also, the gas discharge device may comprise a restoring part, which restores a position of the gasket to close the gas discharge hole when the external force is removed.

Also, the restoring of the position of the gasket may be performed by elastic energy stored within the restoring part.

Also, the restoring part may have first and second opposite ends, the first end contacting an inner wall of the battery case that faces the gas discharge hole, and the second end contacting the gasket, such that the elastic energy is generated by the applying of the external force to the switch.

Also, when the external force is applied to the switch, the gasket may linearly move inside of the battery case to compress the restoring part.

Also, the gasket may be integrated with the restoring part.

Also, the gasket may be separated from the restoring part.

Also, the gasket may be integrated with the switch.

To achieve the above-described object, a secondary battery according to an embodiment of the present invention: a battery case accommodating an electrode assembly therein, in which electrodes and a separator are alternately stacked, and maintained in a predetermined outer appearance; a gasket disposed in the battery case, the gasket being configured to permit selective opening and closing of a gas discharge hole through which an inside and an outside of the battery case communicate with each other; a switch configured to transmit an external force to the gasket when the external force is applied to linearly move the gasket, thereby opening the gas discharge hole; and a restoring part configured to restore a position of the switch when the external force is removed, thereby closing the gas discharge hole.

Also, the restoring part may be configured to store elastic energy, such that a position of the gasket is restored when the external force is removed.

Also, the restoring part may have first and second opposite ends, the first end contacting an inner wall of the battery case that faces the gas discharge hole, and the second end contacting the gasket, such that the elastic energy is generated when the external force is applied to the switch.

Also, when the external force is applied to the switch, the gasket may be configured to linearly move inside of the battery case to compress the restoring part.

Also, the gasket may be integrated with the restoring part.

Also, the gasket may be separated from the restoring part.

Also, the gasket may be integrated with the switch.

Particularities of other embodiments are included in the detailed description and drawings.

Advantageous Effects

The embodiments of the present invention may have at least the following effects.

The gas discharge device may be formed in the battery case to perform the pre-formation even after the assembly process and thereby to reduce the assembling time, improve the initial charging rate, and increase in gas discharge amount.

Also, in the manufacturing process of the secondary battery, the gas remaining in the battery case may be easily discharged by only pushing the switch of the gas discharge device.

Also, the pressure within the battery case may be lowered than the atmospheric pressure after the electrolyte is injected to completely discharge the gas remaining in the battery case.

The effects of the prevent invention are not limited by the aforementioned description, and thus, more varied effects are involved in this specification.

MODE FOR CARRYING OUT THE INVENTION

Figure 1:
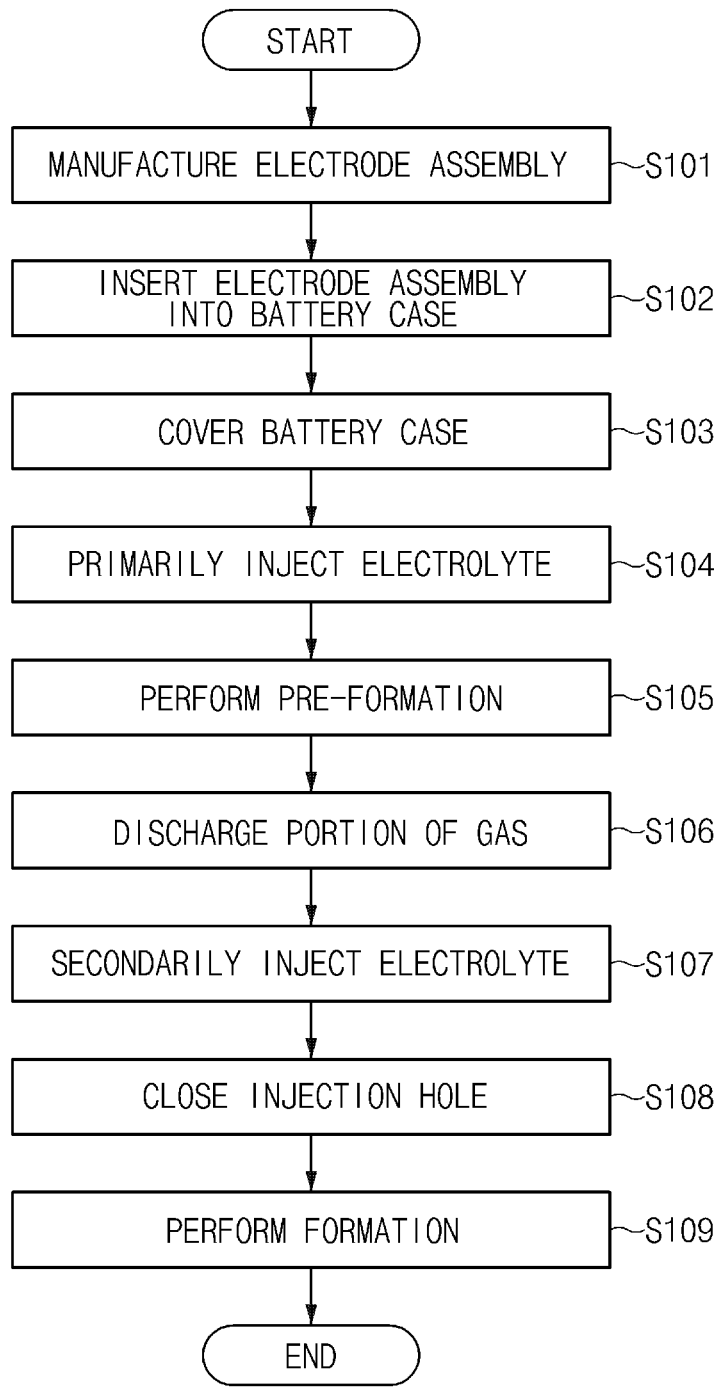
FIG. 1 is a flowchart illustrating a method for manufacturing a can type secondary battery according to a related art.

Advantages and features of the present disclosure, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the inventive concept. In this specification, the terms of a singular form may comprise plural forms unless specifically mentioned. The meaning of 'comprises" and/or "comprising' does not exclude other components besides a mentioned component.

Hereinafter, preferred embodiments will be described in detail with reference to the accompanying drawings.

FIG. 1 is a flowchart illustrating a method for manufacturing a can type secondary battery according to a related art.

As described above, in the pouch type secondary battery, since a hole is punched in one surface of a pouch, a pre-formation or formation process may be performed after an assembly process to discharge a gas to the outside. However, in the can type secondary battery, since a hole is not punched in one surface of a case, it is impossible to discharge a gas generated in the case when a formation process is performed after an injection hole for an electrolyte is closed.

In more detail, a process of manufacturing the secondary battery is largely classified into three processes such as an electrode plate process, an assembly process, and a formation process. The electrode plate process is a process of manufacturing a positive electrode plate and a negative electrode plate. Here, an active material may be applied to a base material to manufacture the positive electrode plate and the negative electrode plate.

The assembly process (S101 to S108) is a process of assembling the secondary battery. Hereinafter, the assembly process will be described with reference to a flowchart of FIG. 1. First, the manufactured positive and negative electrode plates and a separator may be alternately stacked to manufacture an electrode assembly (S101). Also, the electrode assembly is inserted into a battery case through an opening of the battery case (S102), and the opening of the battery case is covered (S103). Here, in the can type secondary battery, the battery case is maintained to have a predetermined outer appearance. Thus, when the opening of the battery case is covered, a top cap assembly is used. Also, the top cap assembly is welded to an outer wall of the battery case to cover the opening of the battery case.

After the battery case is covered, an electrolyte is primarily injected through an injection hole formed in the battery case (S104). Since the electrolyte is secondarily injected later, only a small amount of electrolyte is injected when the electrolyte is primarily injected. Then, a pre-formation process is performed (S105). The pre-formation process is a process of forming an SEI layer on a surface of the electrode plates of the electrode assembly to generate charges. For this, initial charging is performed on the electrode assembly. Here, a gas is generated in the battery case. According to the related art, the pre-formation process is included in the assembly process. Thus, when the secondary battery is still in an assembly line, the pre-formation process is performed in a dray room without closing the injection hole. However, since it is difficult to perform the pre-formation process for a long time in the state in which the injection hole is opened, only a small amount of gas is discharged (S106), and thus, the rest gas is remained in the battery case. If the remaining gas is too much, the secondary battery may increase in thickness. Also, while the gas is discharged to the outside through the injection hole, the electrolyte may be discharged to the outside due to overflow. However, since the assembly time is determined in the assembly process, it does not take much time to discharge the gas. Thus, in order to reduce an amount of remaining gas without excessively consuming the assembly time, the charging rate does not increase at the initial charging, and also, the gas has to be charged at a charging rate of 10% to 13%. Also, the next process is performed in the state in which only a small amount of gas is discharged.

Then, the electrolyte is secondarily injected (S107). Of course, when the electrolyte is secondarily injected, a pressure is lowered so that the vicinity thereof is close to a vacuum state, or the secondary battery is pressed. In this process, the gas remaining in the battery case may be further discharged. However, in this process, the gas within the battery case is not completely discharged, and also, an amount of gas remaining in the battery case is not accurately measured. The injection hole is closed as the last step of the assembly process (S108). Thus, the assembly of the secondary battery is completed. However, since the injection hole is closed in the state in which the gas is capable of remaining in the battery case, the secondary battery may increase still in thickness.

Lastly, a formation process is performed (S109). The formation process is a process of finalizing the charging so that the secondary battery is capable of supplying electric power. Here, an external power source may be connected to the electrodes of the secondary battery to perform the charging, and then, an aging process may be further performed. When the charging is performed in the formation process, the charging may be performed at the maximum charging rate unlike the initial charging. The aging process is a process of storing the assembled secondary battery for a predetermined time at specific temperature and humidity. Here, the electrolyte is sufficiently dispersed in the secondary battery to optimize movement of ions.

Since the formation process is a process different from the assembly process, the formation process may be performed after getting out of the assembly line. However, while the formation process is performed, a gas may be generated again in the battery case. However, since the injection hole of the secondary battery is already closed, the generated gas may not be discharged, and thus, the secondary battery may increase in thickness.

Figure 2:
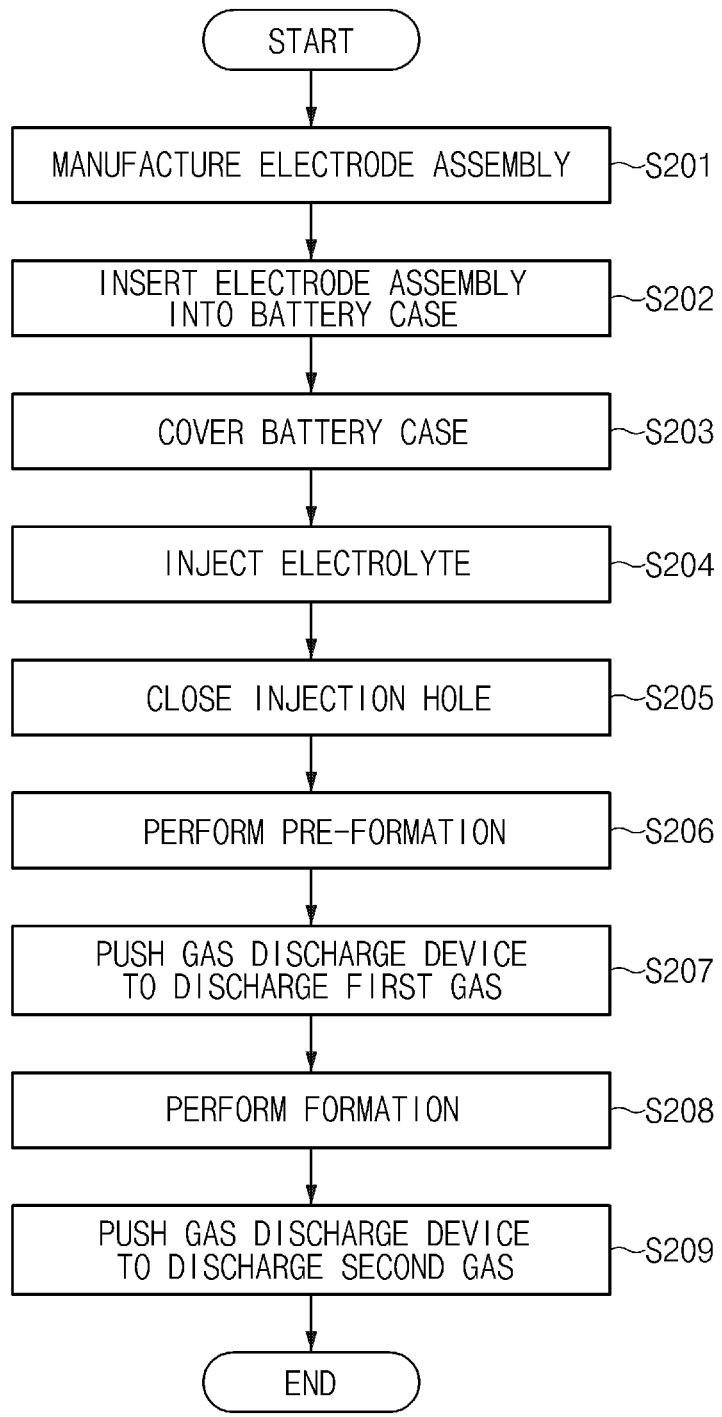
FIG. 2 is a flowchart illustrating a method for manufacturing a secondary battery according to an embodiment of the present invention.

FIG. 2 is a flowchart illustrating a method for manufacturing a secondary battery (see reference numeral 1 of FIG. 3) according to an embodiment of the present invention.

Figure 3:
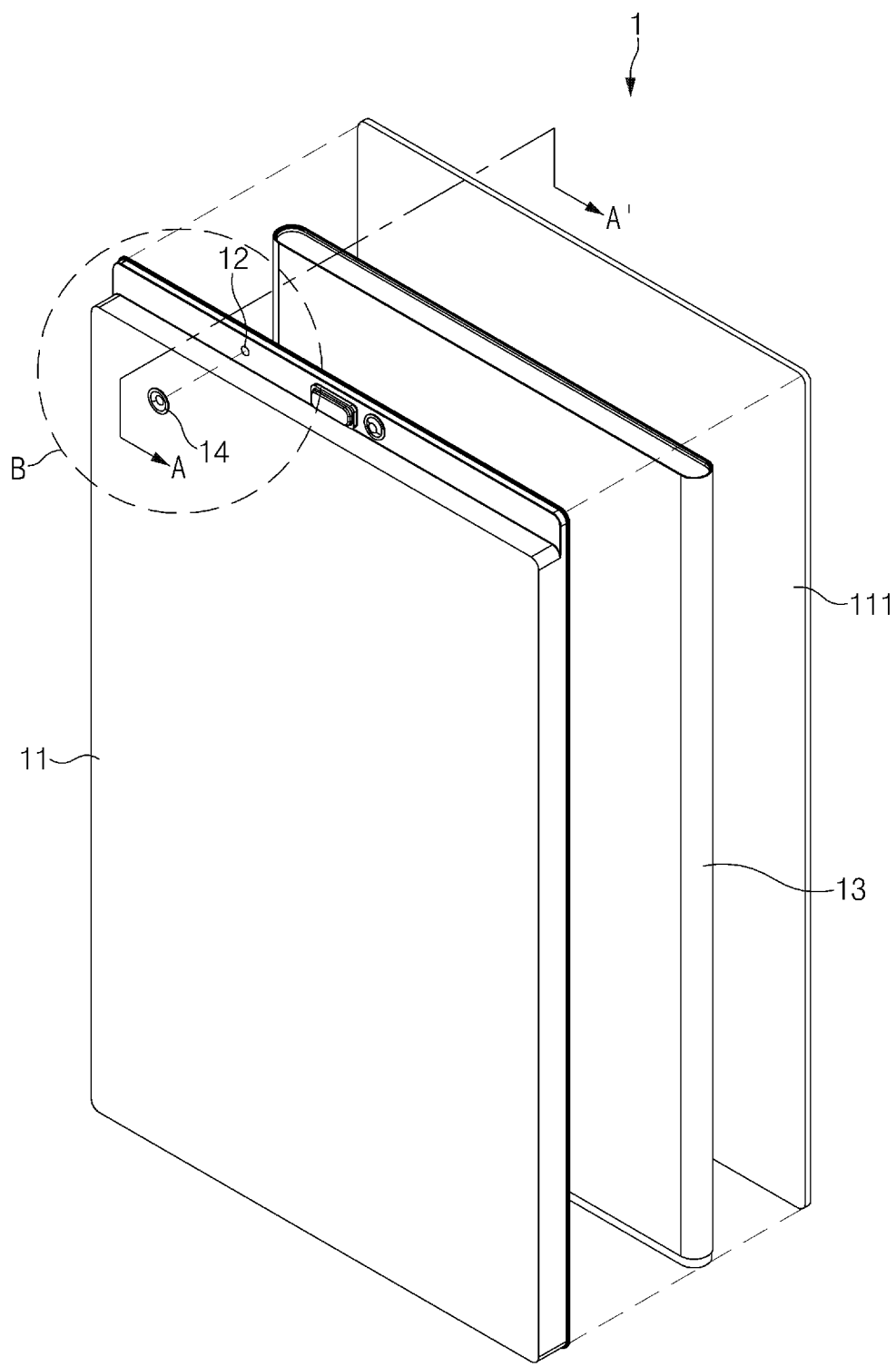
FIG. 3 is an exploded perspective view illustrating the secondary battery according to an embodiment of the present invention.

In the secondary battery 1 according to an embodiment of the present invention comprises a gas discharge device (see reference numeral 12 of FIG. 3). Thus, a pre-formation process may not be performed in an assembly process but may performed after getting out of an assembly line. Also, even after the formation process is performed, a gas within a battery case (see reference numeral 11 of FIG. 3) may be discharged to the outside. Hereinafter, the method for manufacturing the secondary battery 1 according to an embodiment of the present invention will be described with reference to the flowchart illustrated in FIG. 2.

First, an active material is applied to a base material through an electrode plate process to manufacture a positive electrode plate and a negative electrode plate. Also, in an assembly process (S201 to S205), first, the manufactured positive and negative electrode plates and a separator are alternately stacked to manufacture an electrode assembly (see reference numeral 13 of FIG. 3) (S201). The electrode assembly 13 is inserted into the battery case 11 through an opening of the battery case 11 (S202). Then, an opening-side outer wall of the battery case 11 is welded to a rear case (see reference numeral 111 of FIG. 3) to cover the opening of the battery case 11 (S203).

After the battery case 11 is covered, an electrolyte is injected through an injection hole formed in the battery case 11 (S204). Here, unlike the method according to the related art, the electrolyte is injected only once without dividing into primary and secondary injections. Thus, a small amount of electrolyte is not injected, but a fixed amount of electrolyte is injected. Also, the injection hole is closed as the last step of the assembly process (S205). Thus, the assembly of the secondary battery 1 is completed.

When the assembly of the secondary battery 1 is completed, the electrode assembly gets out of the assembly line. Then, a pre-formation process is performed (S206). Here, in the secondary battery 1 according to an embodiment of the present invention, the gas discharge device 12 is formed in the battery case 11. Thus, the pre-formation process may be performed to improve an initial charging rate to a very high level of approximately 60% to 70%. Also, although an amount of first gas generated while the pre-formation process is performed is much, the assembly process is already completed, the first gas may be sufficiently discharged without being limited to an assembly time (S207). Thus, the gas remaining in the battery case 11 may be maximally reduced to prevent the secondary battery 1 from increasing in thickness.

Furthermore, since a manipulation method of the gas discharge device 12 is very simple, the first gas remaining in the battery case 11 may be easily discharged by only pushing a switch (see reference numeral 121 of FIG. 3) of the gas discharge device 12.

After the pre-formation process is performed, a formation process is performed (S208). When the formation process is performed, a second gas is generated in the battery case 11. However, like the first gas, the second gas may be easily discharged by only pushing the switch 121 of the gas discharge device 12.

Here, the pre-formation process may be performed, and then, the formation process may be immediately performed without discharging the first gas. That is, the step S207 may be omitted, and the step S208 may be performed immediately. However, since an amount of first gas generated in the pre-formation process is too much, it is preferable that the step S208 is performed after the step S207 is performed.

Also, a separate pressure pump may be connected to the gas discharge device 12. In this case, a pressure within the battery case 11 may be lowered than the atmospheric pressure. Thus, even though a small amount of gas remains in the battery case 11, the gas may be completely discharged to the outside.

FIG. 3 is an exploded perspective view illustrating the secondary battery 1 according to an embodiment of the present invention.

Hereinafter, the method for manufacturing the secondary battery 1 according to an embodiment of the present invention has been described. As described above, since the gas discharge device 12 is formed in the secondary battery 1 according to an embodiment of the present invention, the above-described method may be performed. Hereinafter, the gas discharge device 12 formed in the secondary battery according to an embodiment of the present invention will be described.

As illustrated in FIG. 3, since the secondary battery 1 according to an embodiment of the present invention is the can type secondary battery, the electrode assembly 13 is accommodated in the battery case 11 made of a metal or plastic having a predetermined shape. Although a prismatic type battery having a polyhedron or polygonal column shape is illustrated in FIG. 3, the embodiment of the present invention is not limited thereto. For example, the battery case 11 may be a cylinder type battery having a cylindrical shape. That is, if the battery case 11 is provided in the can type having a predetermined shape, various kinds of secondary batteries 1 may be provided without limitation.

As illustrated in FIG. 3, the gas discharge device 12 is formed at one side of the secondary battery 1. In the general gas discharge device 12, when the gas is generated from the electrolyte while the secondary battery 1 is used, the internal pressure increases. Then, when the internal pressure is above a predetermined pressure, the gas discharge device 12 is automatically opened to discharge the gas to the outside. That is, when the pressure within the battery case 11 is less than the predetermined pressure, the gas discharge device 12 is not opened. On the other hand, the gas discharge device 12 according to an embodiment of the present invention may discharge the gas to the outside even though the pressure within the battery case 11 is not above the predetermined pressure. Even if a separate vacuum pump is used, the gas may be easily discharged to the outside even though the pressure within the battery case 11 is not above the atmospheric pressure.

Since all of the electrolyte and the gas may be accommodated in the battery case 11, and the gas has density that is very lower than that of the electrolyte, the electrolyte is disposed in a lower portion of the battery case 11, and the gas is disposed in an upper portion of the battery case 11. Thus, in order to select only the gas and then easily discharge the gas, is preferable that the gas discharge device 12 is disposed above the battery case 11.

Figure 4:
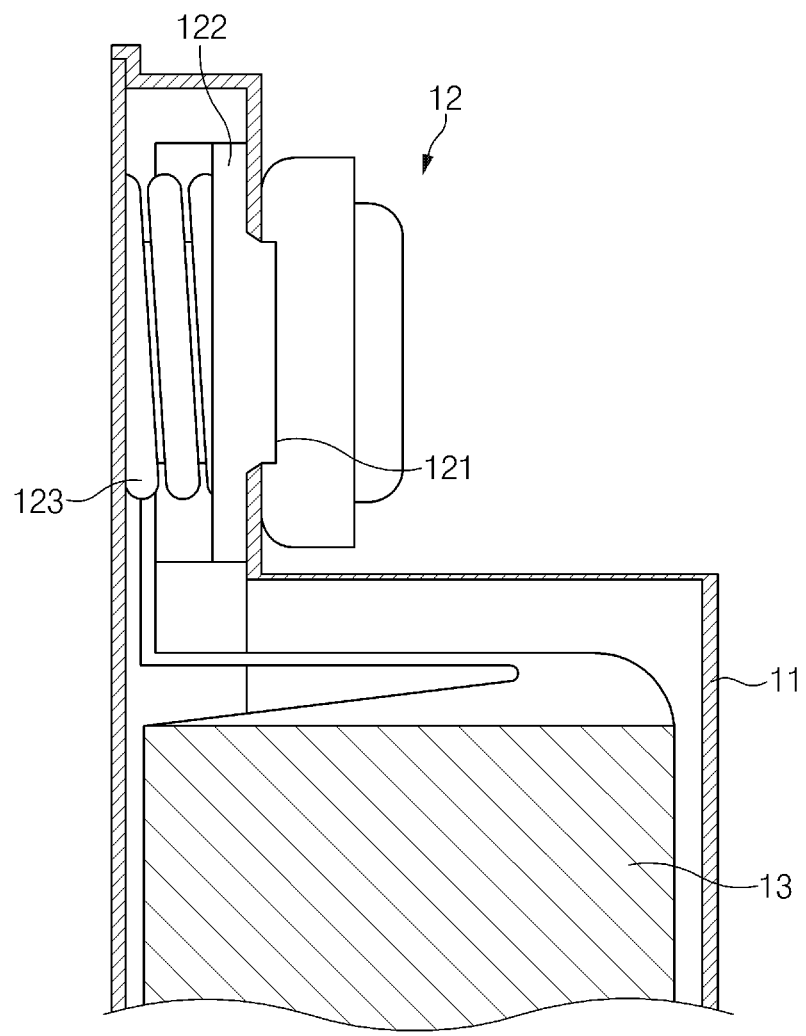
FIG. 4 is an enlarged lateral cross-sectional view taken along line A-A' of FIG. 3 in the secondary battery according to an embodiment of the present invention.

FIG. 4 is an enlarged lateral cross-sectional view taken along line A-A' of FIG. 3 in the secondary battery 1 according to an embodiment of the present invention.

A gas discharge hole for allowing the inside and outside of the battery case 11 to communicate with each other is formed in one side of the battery case 11, and the gas discharge device 12 opens and closes the gas discharge hole. As illustrated in FIG. 4, the gas discharge device 12 according to an embodiment of the present invention comprises a switch 121, a gasket 122, a restoring part 123.

The switch 121 is formed to be exposed to the outside of the battery case 11. It is preferable that the switch 121 is formed to protrude from a discharge hole. Also, a user may easily apply external force from the outside the secondary battery 1 by using a finger or the like. When the user applies the external force to the switch 121, the switch 121 transmits the external force to the gasket 122 to allow the gasket 122 to linearly move.

The gasket 122 is formed in the battery case 11 to open and close the gas discharge hole. The gas generated in the battery case 11 may be discharged to the outside through the gas discharge hole. Here, the gasket 122 is formed in the battery case 11 to receive restoring force applied from the inside to the outside of the battery case 11 through the restoring part 123. Thus, the gasket 122 may seal the gas discharge hole. However, when the external force is applied to the switch 121, the gasket 122 receives the external force from the switch 121 to linearly move. Here, the gasket 122 receives the external force from the outside to the inside of the battery case 11. Thus, the gasket 122 linearly moves from the inside to the outside of the battery case 11 in a direction in which the external force is applied. Thus, the gasket 122 opens the gas discharge hole to discharge the gas within the battery case 11 to the outside.

The restoring part 123 provides restoring force to the gasket so that the gasket 122 seals the gas discharge hole. It is preferable that the restoring part 123 is made of a material having elasticity. Particularly, according to an embodiment of the present invention, the restoring part 123 may be made of a metal material having elasticity such as a spring and may have a shape that lengthily extends in an axial direction while forming a circle having a predetermined size, for example, a spiral shape. However, the embodiment of the present invention is not limited thereto. For example, the restoring part 123 may have various sizes and shape as long as the restoring part 123 generates the restoring force to provide the generated restoring force to the gasket 122.

The restoring force may be an actual elastic force generated from the restoring part 123. That is, when the external force is applied through the switch 121, the restoring part 123 is deformed in a longitudinal direction while the gasket 122 linearly moves. Here, elastic force is generated in proportion to a degree of deformation and a modulus of elasticity. Here, the restoring part 123 has to be deformed in the longitudinal direction by the external force. Thus, as illustrated in FIG. 4, it is preferable that both ends of the restoring part 123 respectively contact an inner wall of the battery case 11, which faces the gas discharge hole, and one surface of the gasket 122. Thus, the direction in which the external force is applied and the direction in which the restoring part 123 is deformed may match each other to generate the largest elastic force.

However, the embodiment of the present invention is not limited thereto. For example, in order to restore the gasket 122 to its original position, the restoring force may be provided in a different manner. For example, a magnet may be attached to each of the inner wall of the battery case 11 and one surface of the gasket 122 to generate magnetic force or generate electric force by generating electricity. That is, the restoring force may be provided in various manners without limitation as long as the gasket 122 is restored in its original position when the external force is removed.

Figure 5:
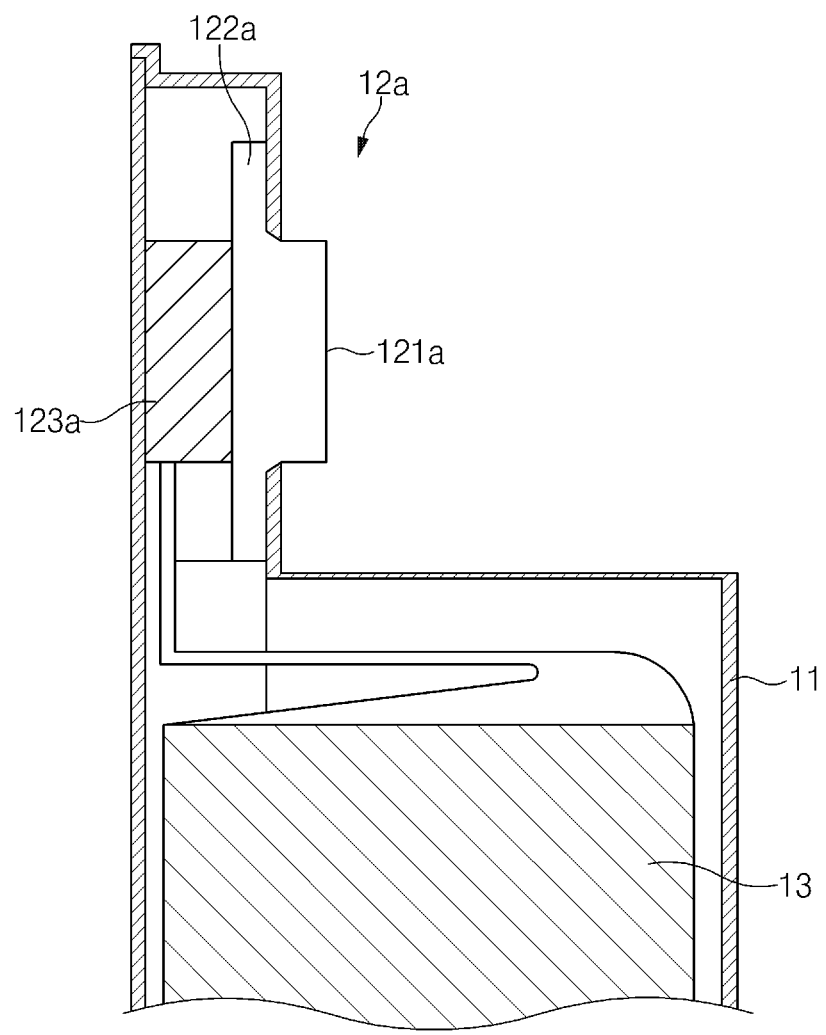
FIG. 5 is an enlarged lateral cross-sectional view taken along line A-A' of FIG. 3 in the secondary battery according to another embodiment of the present invention.

FIG. 5 is an enlarged lateral cross-sectional view taken along line A-A' of FIG. 3 in the secondary battery 1 according to another embodiment of the present invention.

As illustrated in FIG. 5, a gas discharge device 12a according to another embodiment of the present invention comprises a switch 121a, a gasket 122a, and a restoring part 123a. Hereinafter, descriptions duplicated with those of the gas discharge device 12 according to the foregoing embodiment of the present invention will be omitted.

According to another embodiment of the present invention, the restoring part 123a may have elasticity. However, the restoring part 123a may not have a spring shape but have a simple column shape as illustrated in FIG. 5. Here, it is preferable that the restoring part 123a is made of a non-metallic material such as rubber or polyurethane and also made of a material having elasticity.

According to various embodiments of the present invention, the switch 12, the gasket 122, and the restoring part 123 of the gas discharge device 12 may be formed to be separated from each other. Alternatively, at least two components may be integrated with each other. Particularly, the switch 121 and the gasket 122 may be manufactured to be separated from each other or integrated with each other. Also, the gasket 122 and the restoring part 123 may be manufactured to be separated from each other or integrated with each other. Furthermore, the switch 121, the gasket 122, and the restoring part 123 may be manufactured to be integrated with each other. Here, when the restoring part 123 is made of a material such as rubber, each of the switch 121 and the gasket 122 may be made of the same material.

It is preferable that the external force applied to the switch 121 is a pressure. Here, when the user pushes the switch 121 by using a finger, the switch 121 transmits the external force to the gasket 122 so that the gasket 122 linearly moves. Also, if one end of the restoring part 123 contacts the inner wall of the battery case 11, which faces the gas discharge hole, the gasket 122 linearly moves, and thus, the restoring part 123 is compressed to generate elasticity. However, if one end of the restoring part 123 contacts the inner wall of the battery case 11, in which the gas discharge hole is formed, the gasket 122 linearly moves, and thus, the restoring part 123 is tensioned to generate elasticity.

The external force may be tensile force without being limited to the pressure. Here, the gasket 122 is not formed in the battery case 11 but formed outside the battery case so that the restoring part 123 receives the restoring force from the outside to the inside. Thus, the gasket 122 may close the gas discharge hole. However, when the external force is applied to the switch 121, i.e., the user pulls the switch 121, the gasket 122 receives the external force from the switch 121 to linearly move. Here, the gasket 122 receives the external force from the inside to the outside of the battery case 11. Thus, the gasket 122 linearly moves from the outside to the inside of the battery case 11 in a direction in which the external force is applied. Thus, the gasket 122 opens the gas discharge hole to discharge the gas within the battery case 11 to the outside.

That is, the secondary battery 1 according to various embodiments of the present invention may have various structures as long as the gasket 122 moves to open the gas discharge hole when the external force is applied to the switch 121, and the gasket 122 is restored by the restoring force of the restoring part 123 to close the gas discharge hole when the external force is removed.

Figure 6:
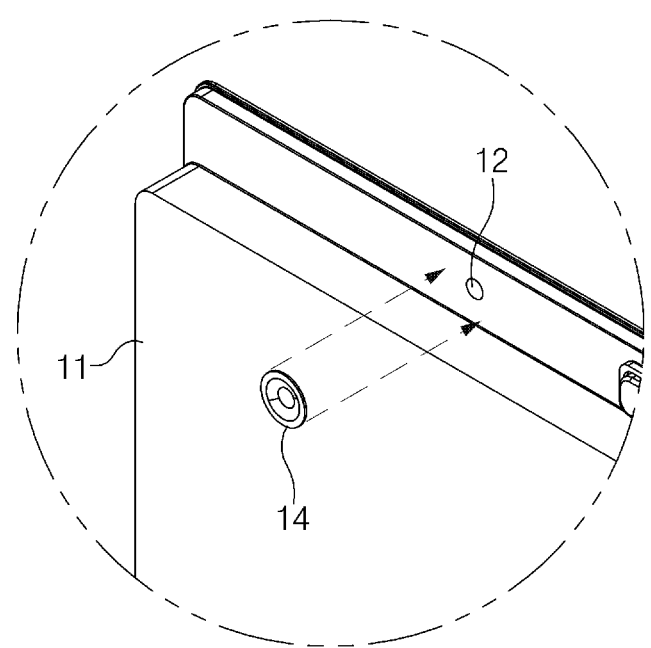
FIG. 6 is a perspective view illustrating a state in which a gas discharge device is sealed according to an embodiment of the present invention.

FIG. 6 is a perspective view illustrating a state in which the gas discharge device 12 is sealed according to an embodiment of the present invention.

In the gas discharge device 12 according to an embodiment of the present invention, the gas generated in the battery case 11 is discharged to the outside. Thus, the gas discharge device 12 may be used in various processes of manufacturing the secondary battery 1, the pre-formation process, and the formation process. However, when the manufacture of the secondary battery 1 is completed, and the secondary battery is sold to general consumers, ordinary users other than experts may inadvertently operate the gas discharge device 12 while using the secondary battery 1. Here, the electrolyte may leak through the gas discharge hole, and when the pressure within the battery case 11 is less than the atmospheric pressure, external air may be introduced into the battery case 11. Thus, as illustrated in FIG. 6, the gas discharge device 12 is covered by a cap 14 and then sealed.

If a gas is generated in the battery case 11 while the secondary battery 1 is used, the secondary battery 1 may increase in thickness. Here, when the sealed cap 14 is removed, and external force is applied to the switch 121 of the gas discharge device 12, the gas within the battery case 11 may be discharged to the outside.

If the cap 14 has a very small size, the cap 14 may not fully cover the switch 121 of the gas discharge device 12, and thus, the switch 121 may be exposed to the outside. On the other hand, if the cap 14 has a very large size, the gas discharge device 12 may not be easily sealed, and also, the overall outer appearance of the secondary battery 1 may be deformed. Thus, it is preferable that the cap has a size that is enough to fully cover the switch 121 of the gas discharge device 12 and easily seal the gas discharge device 12. More preferably, if each of the cap 14 and the switch 121 of the gas discharge device 12 has a circular shape, the cap 14 may have a diameter greater 1.2 times to 1.5 times than that of the gas discharge device 12.

Preferably, the sealing of the gas discharge device 12 by using the cap 12 may be performed after the formation process is completed, and the second gas is discharged to the outside. However, the embodiment of the present invention is not limited thereto. For example, the sealing of the gas discharge device 12 may be performed after the pre-formation process is completed, and only the first gas is discharged to the outside. That is, the gas discharge device 12 may be sealed before the formation process. This is done because an amount of second gas generated through the formation process is generally greater than that of second gas generated through the pre-formation process. If it is, the amount of generated second gas is expected to be very small, the gas discharge device 12 may be sealed before the formation process so at to reduce the manufacturing time of the secondary battery 1.

After the gas discharge device 12 is covered by the cap 14, the cap 14 may be fixed to the battery case 11 through laser welding or the like. However, the embodiment of the present invention is not limited thereto. For example, the cap 14 may be fixed to the battery case 11 through various manners such as electric welding, gas welding, and the like as long as the cap 14 is fixed to the battery case 11.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A method for manufacturing a secondary battery, the method comprising:
   manufacturing an electrode assembly in which electrodes and a separator are alternately stacked;
   inserting the electrode assembly into a battery case through an opening;
   covering the opening of the battery case;
   injecting an electrolyte into the battery case through an injection hole formed in the battery case;
   closing the injection hole;
   performing a pre-formation process;
   applying external force to a switch of a gas discharge device positioned along one surface of the battery case, thereby linearly moving a gasket of the gas discharge device and opening a gas discharge hole, such that a first gas generated in the battery case is discharged to an outside of the battery case during the performing of the pre-formation process, the gas discharge device including a restoring part having first and second opposite ends, the first end contacting an inner wall of the battery case that faces the gas discharge hole, and the second end connected to the gasket, such that that elastic energy generated by the applying of the external force to the switch is stored within the restoring part; and
   removing the external force from the switch, thereby allowing the elastic energy stored within the restoring part to restore a position of the gasket and close the gas discharge hole.

2. The method of claim 1, further comprising, after the first gas is discharged to the outside of the battery case, sealing the gas discharge device.

3. The method of claim 2, wherein the sealing of the gas discharge device further comprises:
   covering the gas discharge device with a cap; and
   performing laser welding to affix the cap to the battery case.

4. The method of claim 1, further comprising, after the first gas is discharged to the outside of the battery case, performing a formation process.

5. The method of claim 4, further comprising, after the performing of the formation process:
   applying the external force to the switch of the gas discharge device; and
   linearly moving the gasket of the gas discharge device and opening the gas discharge hole, such that a second gas generated in the battery case is discharged to an outside of the battery case during the performing of the formation process.

6. The method of claim 5, further comprising, after the second gas is discharged to the outside of the battery case, sealing the gas discharge device.

7. The method of claim 6, wherein the step of sealing the gas discharge device further comprises:
   covering the gas discharge device with a cap; and
   performing laser welding to affix the cap to the battery case.

8. The method of claim 1, wherein, when the external force is applied to the switch, the gasket linearly moves inside of the battery case to compress the restoring part.

9. A secondary battery comprising:
   a battery case accommodating an electrode assembly therein, in which electrodes and a separator are alternately stacked;
   a gasket disposed in the battery case, the gasket being configured to permit selective opening and closing of a gas discharge hole through which an inside and an outside of the battery case communicate with each other;
   a switch configured to transmit an external force to the gasket when the external force is applied to linearly move the gasket, thereby opening the gas discharge hole; and
   a restoring part configured to restore a position of the switch when the external force is removed, thereby closing the gas discharge hole, wherein the restoring part is configured to store elastic energy, such that a position of the gasket is restored when the external force is removed, and wherein the restoring part has first and second opposite ends, the first end contacting an inner wall of the battery case that faces the gas discharge hole, and the second end connected to the gasket, such that the elastic energy is generated when the external force is applied to the switch.

10. The secondary battery of claim 9, wherein the gasket is configured to linearly move inside of the battery case to compress the restoring part when the external force is applied to the switch.

* * * * *